US011693386B2

(12) United States Patent
Kim et al.

(10) Patent No.: US 11,693,386 B2
(45) Date of Patent: Jul. 4, 2023

(54) METHOD AND ELECTRONIC DEVICE FOR GUIDING SEMICONDUCTOR MANUFACTURING PROCESS

(71) Applicant: SAMSUNG ELECTRONICS CO., LTD., Suwon-si (KR)

(72) Inventors: Jaeho Kim, Seoul (KR); Kanghyun Baek, Seoul (KR); Kwanghee Lee, Seoul (KR); Yongwoo Jeon, Seoul (KR); Uihui Kwon, Hwaseong-si (KR); Yoonsuk Kim, Hwaseong-si (KR)

(73) Assignee: SAMSUNG ELEOTRONICS CO., LTD., Suwon-si (KR)

( * ) Notice: Subject to any disclaimer, the term of this patent is extended or adjusted under 35 U.S.C. 154(b) by 379 days.

(21) Appl. No.: 16/992,919

(22) Filed: Aug. 13, 2020

(65) Prior Publication Data

US 2021/0063999 A1 Mar. 4, 2021

(30) Foreign Application Priority Data

Aug. 27, 2019 (KR) .................. 10-2019-0105286
Apr. 28, 2020 (KR) .................. 10-2020-0051830

(51) Int. Cl.
*G05B 19/4097* (2006.01)
*G06N 20/00* (2019.01)

(52) U.S. Cl.
CPC ......... *G05B 19/4097* (2013.01); *G06N 20/00* (2019.01); *G05B 2219/45031* (2013.01)

(58) Field of Classification Search
None
See application file for complete search history.

(56) References Cited

U.S. PATENT DOCUMENTS 6,826,517 B2 11/2004 Okada
7,203,628 B1 4/2007 St. Ville
(Continued)

FOREIGN PATENT DOCUMENTS

JP 4973957 B2 7/2012
KR 1020160110116 A 9/2016
KR 101917006 B1 11/2018

OTHER PUBLICATIONS

Huang et al., "Intelligent Manufacturing: TCAD-Assisted Adaptive Weighting Neural Networks," IEEE, 2018, 12pg. (Year: 2018).*

(Continued)

*Primary Examiner* — Ryan D. Coyer
(74) *Attorney, Agent, or Firm* — Sughrue Mion, PLLC

(57) ABSTRACT

A method of guiding a semiconductor manufacturing process includes receiving semiconductor manufacturing process data corresponding to a target semiconductor product, generating first semiconductor characteristic data corresponding to the semiconductor manufacturing process data by using a technology computer-aided design (TCAD) model trained through machine learning based on training data including TCAD simulation data, generating second semiconductor characteristic data corresponding to the semiconductor manufacturing process data by using a compact model generated based on information of measurement of at least one semiconductor characteristic of a first semiconductor product, generating, based on the first semiconductor characteristic data and the second semiconductor characteristic data, a plurality of process policies respectively corresponding to a plurality of strategic references, by using a plurality of strategy models; and providing a final process policy corresponding to the target semiconductor product based on the plurality of process policies.

19 Claims, 13 Drawing Sheets

(56) References Cited

U.S. PATENT DOCUMENTS

| | | | |
|---|---|---|---|
| 7,792,595 B1 | 9/2010 | Bornholt et al. | |
| 8,037,430 B2* | 10/2011 | Papanikolaou | G06F 30/3323 |
| | | | 716/56 |
| 8,090,464 B2 | 1/2012 | Bornholt et al. | |
| 10,018,996 B2 | 7/2018 | Bornholt et al. | |
| 10,204,188 B2 | 2/2019 | Wang et al. | |
| 10,242,142 B2* | 3/2019 | Greiner | G06F 30/39 |
| 2005/0267882 A1* | 12/2005 | Aupperlee | G05B 19/042 |
| 2009/0005894 A1* | 1/2009 | Bomholt | G06F 30/20 |
| | | | 703/7 |
| 2010/0010782 A1 | 1/2010 | Zhu et al. | |
| 2015/0120216 A1 | 4/2015 | Vukkadala et al. | |
| 2015/0317420 A1 | 11/2015 | Terterian et al. | |
| 2017/0193400 A1* | 7/2017 | Bhaskar | G06N 3/0454 |
| 2017/0200260 A1 | 7/2017 | Bhaskar et al. | |
| 2017/0351952 A1* | 12/2017 | Zhang | G06K 9/6274 |
| 2019/0065630 A1 | 2/2019 | Kim et al. | |
| 2019/0073568 A1* | 3/2019 | He | G06V 10/40 |
| 2019/0286983 A1 | 9/2019 | Jung et al. | |

OTHER PUBLICATIONS

Teo Chea Wei, "TCAD Modelling and Characterization of Defects in Advanced Nanoscale Semiconductor Devices," National University of Singapore, May 2019, 94pg. (Year: 2019).*

* cited by examiner

FIG. 5

SEMICONDUCTOR MANUFACTURING PROCESS DATA

| Type | Value |
|---|---|
| Product | A |
| Process | B |
| Device | C |
| Version | D |
| Layout | E |
| Ion implantation | F |

FIG. 6

OUTPUT SETTING

| Output Data | Select |
|---|---|
| Vt | O |
| Gain | X |
| Linearity | X |
| Breakdown voltage | O |
| Oxide degradation | X |
| Junction/Tunneling Leakage | X |
| Id-Vg | X |
| Vd-Id | X |
| C-V | X |
| Profile Image | O |
| Field Image | X |

METHOD AND ELECTRONIC DEVICE FOR GUIDING SEMICONDUCTOR MANUFACTURING PROCESS

CROSS-REFERENCE TO THE RELATED APPLICATIONS

This application claims priority to Korean Patent Application Nos. 10-2019-0105286, filed on Aug. 27, 2019 and 10-2020-0051830, filed on Apr. 28, 2020, in the Korean Intellectual Property Office, the disclosures of which are herein incorporated by reference in their entireties.

BACKGROUND

Example embodiments of the inventive concept relate to a method and an electronic device for guiding a semiconductor manufacturing process, and more particularly, to a method and an electronic device for providing a process policy for a semiconductor product according to a user input and based on a technology computer-aided design (TCAD) model and a compact model.

With the development of the electronics industry, the semiconductor foundry industry, in which a manufacturer produces semiconductor products designed by other companies, is increasingly important. In the foundry industry, a manufacturer may check the performance of a semiconductor product through a simulation before actually manufacturing the semiconductor product according to a design. In this case, when the design of the semiconductor product needs to be changed (e.g., by a request from a client of the manufacturer) during the course of simulation, it may take an enormous amount of time to newly perform a simulation based on the changed design, and accordingly, extra cost and time loss may be incurred. Moreover, the client of the manufacturer may request data about the simulation from the manufacturer. In this case, the manufacturer's simulation and manufacturing know-how may be indiscreetly released.

SUMMARY

One or more example embodiments of the inventive concept provide a method and an electronic device for providing a process policy (e.g., an optimal process policy) based on technology computer-aided design (TCAD)-based simulation data and compact model-based data reflecting semiconductor characteristics of an existing semiconductor product and for enhancing security of manufacturing know-how by assigning a different authority level to each item of user information.

According to an aspect of the inventive concept, there is provided a method of guiding a semiconductor manufacturing process, the method including: receiving semiconductor manufacturing process data corresponding to a target semiconductor product; generating first semiconductor characteristic data corresponding to the semiconductor manufacturing process data by using a technology computer-aided design (TCAD) model, the TCAD model being trained through machine learning based on training data including TCAD simulation data; generating second semiconductor characteristic data corresponding to the semiconductor manufacturing process data by using a compact model, the compact model being generated based on information of measurement of at least one semiconductor characteristic of a first semiconductor product; generating, based on the first semiconductor characteristic data and the second semiconductor characteristic data, a plurality of process policies respectively corresponding to a plurality of strategic references, by using a plurality of strategy models; and providing a final process policy corresponding to the target semiconductor product based on the plurality of process policies.

According to another aspect of the inventive concept, there is provided an electronic device for guiding a semiconductor manufacturing process. The electronic device includes a display; at least one non-transitory computer-readable medium; and at least one processor configured to execute instructions stored in the at least one non-transitory computer-readable medium, wherein the at least one processor is further configured to: receive semiconductor manufacturing process data corresponding to a target semiconductor device; generate first semiconductor characteristic data corresponding to the semiconductor manufacturing process data by using a technology computer-aided design (TCAD) model, the TCAD model being trained through machine learning based on training data including information about a plurality semiconductor characteristics; generate second semiconductor characteristic data corresponding to the semiconductor manufacturing process data by using a compact model, the compact model being generated based on information of measurement of at least one semiconductor characteristic of a first semiconductor device; and generate, based on the first semiconductor characteristic data and the second semiconductor characteristic data, a plurality of process policies corresponding to a plurality of strategic references by using a plurality of strategy models, and control the display to display at least one of the plurality of process policies as a process policy corresponding to the target semiconductor device.

According to a further aspect of the inventive concept, there is provided an electronic system for guiding a semiconductor manufacturing process. The electronic system includes a communication unit: a display; a processor configured to: receive semiconductor manufacturing process data corresponding to a target semiconductor device; output first semiconductor characteristic data corresponding to the semiconductor manufacturing process data by using a technology computer-aided design (TCAD) model, the TCAD model being trained through machine learning based on training data including TCAD simulation data; output second semiconductor characteristic data corresponding to the semiconductor manufacturing process data by using a compact model, the compact model being generated based on information of measurement of at least one semiconductor characteristic of a first semiconductor device; generate a plurality of process policies based on the first semiconductor characteristic data and the second semiconductor characteristic data; and a management device configured to receive user information from the processor and transmit, to the processor, information about an authority level corresponding to the user information, wherein the processor is further configured to control the display to display at least a part of the plurality of process policies based on the information about the authority level.

BRIEF DESCRIPTION OF THE DRAWINGS

Embodiments of the inventive concept will be more clearly understood from the following detailed description taken in conjunction with the accompanying drawings in which:

FIG. 5 is a table for describing semiconductor manufacturing process data, according to an example embodiment;

FIG. 6 is a table for describing an output setting according to an example embodiment;

DETAILED DESCRIPTION

Hereinafter, example embodiments will be described in detail with reference to the accompanying drawings.

Figure 1:
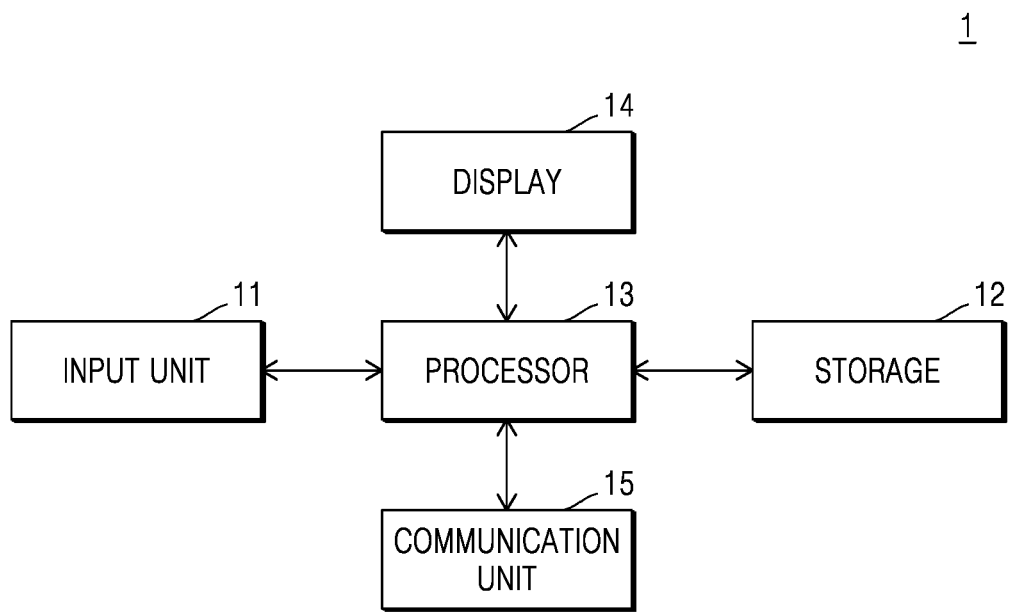
FIG. 1 is a block diagram of an electronic device according to an example embodiment.

FIG. 1 is a block diagram of an electronic device according to an example embodiment.

Referring to FIG. 1, an electronic device 1 may include an input unit 11, a storage 12, a processor 13, a display 14, and a communication unit 15. The electronic device 1 may provide a process policy for a target semiconductor product to be manufactured, based on various kinds of information related to the target semiconductor product. For example, the electronic device 1 may acquire information about expected semiconductor characteristics (for example, electrical characteristics and/or structural characteristics) by performing a simulation based on information related to a target semiconductor product and provide a process policy for the target semiconductor product based on the acquired information about the characteristics. The process policy may include various kinds of information, such as a design structure, an applied voltage, and a type of ion implantation, related to manufacturing processes of a semiconductor product.

The input unit 11 may receive semiconductor manufacturing process data, which is used in a simulation of a target semiconductor product, from a user. The user may input the semiconductor manufacturing process data corresponding to the target semiconductor product to the electronic device 1 through the input unit 11.

Semiconductor manufacturing process data may include information about at least one selected from a kind of a semiconductor product, a semiconductor manufacturing process, a semiconductor device, and a version of the semiconductor product. The semiconductor manufacturing process data may further include information about at least one semiconductor layout (or structure) and ion implantation, which correspond to the semiconductor product, a process, a device, and/or a version of the semiconductor product. Information about ion implantation may include a kind of dopant and the concentration of the dopant. The semiconductor manufacturing process data is not limited to those described above and may additionally include various kinds of information.

In an embodiment, the input unit 11 may receive, from a user, information about at least one selected from a kind, a process, a device and a version of a semiconductor product corresponding to a target semiconductor product and information about at least one selected from a semiconductor layout and ion implantation. For example, the input unit 11 may receive, from a user, a first semiconductor product corresponding to a target semiconductor product and a first semiconductor layout corresponding to the first semiconductor product.

In an embodiment, the input unit 11 may receive, from a user, information about at least one selected from a semiconductor layout and ion implantation, which correspond to a target semiconductor product, as semiconductor manufacturing process data. For example, the input unit 11 may receive, from a user, only second semiconductor ion-implantation information corresponding to a second semiconductor device, the second semiconductor device corresponding to a target semiconductor product. The semiconductor manufacturing process data received through the input unit 11 may be provided to the processor 13. The semiconductor manufacturing process data received by the input unit 11 is not limited to the examples described above.

The input unit 11 may also receive, from a user, an electrical and/or structural characteristic of the target semiconductor product as an output setting. The output setting may be setup information indicating a user selection of, as the simulation result of the target semiconductor product, at least one characteristic desired by a user among the electrical and/or structural characteristic of the target semiconductor product. For example, information that a user may select through the output setting may include at least one selected from a threshold voltage, gain, linearity, a breakdown voltage, oxide degradation, a junction and/or tunneling leakage current, a capacitance-voltage (C-V) curve, a current-voltage (I-V) curve, a drain current-gate voltage (Id-Vg) curve, a drain voltage-drain current (Vd-Id) curve, a profile image (e.g., an electric potential profile, a doping profile, or an electrostatic field profile) of a semiconductor product, and a field image of the semiconductor product.

For example, the input unit 11 may include one or more hardware interfaces such as a keyboard, a mouse, and a touch panel and one or more software interfaces such as a graphical user interface and a text-based interface. In another example, the input unit 11 may include a universal interface configured to receive semiconductor manufacturing process data and an output setting from an internal or external device of the electronic device 1. Examples of the universal interface may include a peripheral component interconnect express (PCIe) interface, a remote direct memory access (RDMA) interface through Ethernet, a serial advanced technology attachment (SATA) interface, a fiber channel interface, a non-volatile memory express (NVMe) interface, an Ethernet interface, and a universal serial bus (USB) interface.

The storage 12 may include at least one non-transitory computer-readable medium. In an embodiment, the storage 12 may additionally include at least one transitory computer-readable medium.

The processor 13 may execute computer program commands and interact with other system elements to perform various functions described herein. The electronic device 1 may include at least one processor 13. Hereinafter, according to some embodiments, the operation of the electronic device 1 may be implemented as instructions stored in a non-transitory computer-readable medium, and the instructions may be executed by the processor 13.

The storage 12 may store a technology computer-aided design (TCAD) model trained based on training data through machine learning. The TCAD model may perform a simulation using semiconductor manufacturing process data as input data and output, as a simulation result, information about an electrical and/or structural characteristic of a target semiconductor product. The TCAD model may be embodied in a mathematical expression according to mathematical and physical theories. The TCAD model may be trained through machine learning using TCAD simulation results as training data. The TCAD model may be trained in advance and stored in the storage 12, but the processor 13 may train the TCAD model through machine learning.

The processor 13 may acquire information about an electrical and/or structural characteristic of a target semiconductor product corresponding to semiconductor manufacturing process data, based on a TCAD model stored in the storage 12. In an embodiment, the processor 13 may input semiconductor manufacturing process data received from the input unit 11 into a TCAD model and acquire an electrical and/or structural characteristic of a target semiconductor product from the TCAD model. Hereinafter, for convenience of description, information about an electrical and/or structural characteristic of a target semiconductor product, which is acquired through a TCAD model, is referred to as first semiconductor characteristic data.

In an embodiment, a TCAD model may generate first semiconductor characteristic data including an electrical and/or structural characteristic corresponding to an output setting input through the input unit 11. For example, when a user inputs a breakdown voltage to the input unit 11 as the output setting, the TCAD model may generate, as a simulation result, the first semiconductor characteristic data including information about the breakdown voltage.

The storage 12 may store a compact model. Like the TCAD model, the compact model may perform a simulation using semiconductor manufacturing process data as input data and output, as a simulation result, information about an electrical and/or structural characteristic of a target semiconductor product. Unlike the TCAD model, the compact model may reflect real measurement information of an electrical and/or structural characteristic of a semiconductor product. In detail, the compact model may reflect measurement information acquired by measuring an electrical and/or structural characteristic of a real semiconductor product, which has been manufactured by semiconductor manufacturing equipment, using semiconductor measuring equipment. The processor 13 may generate or update the compact model based on the measurement information acquired by measuring the electrical and/or structural characteristic of the real semiconductor product.

The processor 13 may acquire information about an electrical and/or structural characteristic of a target semiconductor product corresponding to semiconductor manufacturing process data, based on a compact model stored in the storage 12. In an embodiment, the processor 13 may input semiconductor manufacturing process data received from the input unit 11 into a compact model and acquire an electrical and/or structural characteristic of a target semiconductor product from the compact model. Hereinafter, for convenience of description, information about an electrical and/or structural characteristic of a target semiconductor product, which is acquired through a compact model, is referred to as second semiconductor characteristic data.

In an embodiment, a compact model may generate second semiconductor characteristic data including an electrical and/or structural characteristic corresponding to an output setting input through the input unit 11. For example, when a user inputs a breakdown voltage to the input unit 11 as the output setting, the compact model may generate, as a simulation result, the second semiconductor characteristic data including information about the breakdown voltage.

Because a compact model reflects an electrical and/or structural characteristic of a real semiconductor product that has been manufactured, a conservative simulation result may be produced. In another example, the compact model may be an empirical data model including a small amount of data. On the other hand, a TCAD model does not include a result of measuring an electrical and/or structural characteristic of a semiconductor product and may thus be considered as a radical data model. Because the TCAD model is trained using a lot of training data, the TCAD model may be a radical data model including a large amount of data.

The processor 13 may generate at least one process policy using first semiconductor characteristic data and second semiconductor characteristic data. In detail, the processor 13 may generate at least one process policy from the first semiconductor characteristic data and the second semiconductor characteristic data using a decision model, the decision model being configured to generate a process policy based on information about an electrical and/or structural characteristic of a semiconductor product. The decision model may generate a process policy using information (e.g., the first semiconductor characteristic data and/or the second semiconductor characteristic data) about an electrical and/or structural characteristic of a target semiconductor product according to a strategic reference for generating a process policy.

In an embodiment, when a decision model has a plurality of strategic references, the decision model may generate a plurality of process policies corresponding to the plurality of strategic references. Strategic references may include at least one selected from a risk taking degree, a priority order of an electrical and/or structural characteristic, and a target range of an electrical and/or structural characteristic and any combination thereof. The strategic references are not limited to those described above and may include various items. An operation of generating a plurality of process policies by using the decision model will be described in detail with reference to FIG. 12 below.

The processor 13 may determine at least one of a plurality of process policies as a final process policy (e.g., as an optimal process policy) by using a decision model. In an embodiment, the input unit 11 may receive, from a user, a decision weight used to determine a final process policy among a plurality of process policies for a semiconductor product. The decision model may determine at least one of the process policies as a final process policy based on the decision weight.

Here, the decision weight may include a priority order regarding at least one of a plurality of semiconductor characteristics. The semiconductor characteristics may include an electrical and/or structural characteristic of a semiconductor product. For example, the semiconductor characteristics may include an electrical and/or structural characteristic of a semiconductor product itself. Alternatively, the semiconductor characteristics may include an electrical and/or structural characteristic of at least one element included in a semiconductor product. An operation of determining at least one of a plurality of process policies as a final process policy by using a decision model will be described in detail with reference to FIG. 12 below.

The processor 13 may display a final process policy through the display 14. Embodiments are not limited thereto. For example, the processor 13 may display all of process policies or a predetermined number of process policies among all of process policies on the display 14 or may sequentially display all of process policies on the display 14.

The processor 13 may include a central processing unit (CPU) and/or a graphics processing unit (GPU). At least one selected from the storage 12, the processor 13, and the communication unit 15 may include an application processor (AP).

The at least one non-transitory computer-readable medium of the storage 12 may include a volatile computer-readable medium that includes, for example but not limited to, a register, a cache, a static random access memory (SRAM), a dynamic RAM (DRAM) or the like, which temporarily stores data and is readable by a device. Unlike the embodiment of FIG. 1, the volatile computer-readable medium may be included in the processor 13. For example, an arithmetic result of the processor 13 may be stored in a transitory computer-readable medium included in the processor 13. However, embodiments are not limited thereto.

The at least one non-transitory computer-readable medium of the storage 12 may include a medium, such as a compact disc (CD), a digital versatile disc (DVD), a hard disc, a solid state drive (SSD), a Blu-ray disc, a USB memory, or a read-only memory (ROM), which stores data semi-permanently and is readable by a device. The non-transitory computer-readable medium may include one or more various kinds of non-volatile memory devices. For example, non-volatile memory devices may include at least one selected from a flash memory, a phase-change RAM (PRAM), a resistive RAM (ReRAM), and a magnetoresistive RAM (MRAM) but are not limited thereto.

A computer program command, a TCAD model, a compact model, and a decision model may be stored in a transitory or non-transitory computer-readable medium. In at least some embodiments, values resulting from a simulation performed by the processor 13 or values obtained from arithmetic processing performed by the processor 13 may be stored in a transitory or non-transitory computer-readable medium. In at least some embodiments, intermediate values generated during machine learning may be stored in a transitory or non-transitory computer-readable medium. In at least some embodiments, first semiconductor characteristic data, second semiconductor characteristic data, and a process policy, which will be described below, may be stored in a transitory or non-transitory computer-readable medium. However, embodiments are not limited thereto.

The display 14 may visually output various data to be used for the operation of the electronic device 1. For example, the display 14 may display a setup screen via which one or more inputs of semiconductor manufacturing process data, an output setting, and a decision weight are received. In another example, the display 14 may display at least one process policy. The display 14 may include at least one selected from a liquid crystal display (LCD), a light emitting diode (LED) display, an organic LED (OLED) display, and a quantum dot (QD) display and may include a three-dimensional (3D) display.

The communication unit 15 may transmit data, a data model, and a process policy, which are generated and/or output by the electronic device 1, to the inside or outside of the electronic device 1 or may receive data and a data model, which are to be used for arithmetic processing of the electronic device 1, from an external device. The communication unit 15 may perform communication via various kinds of wired and/or wireless communication interfaces.

Figure 2:
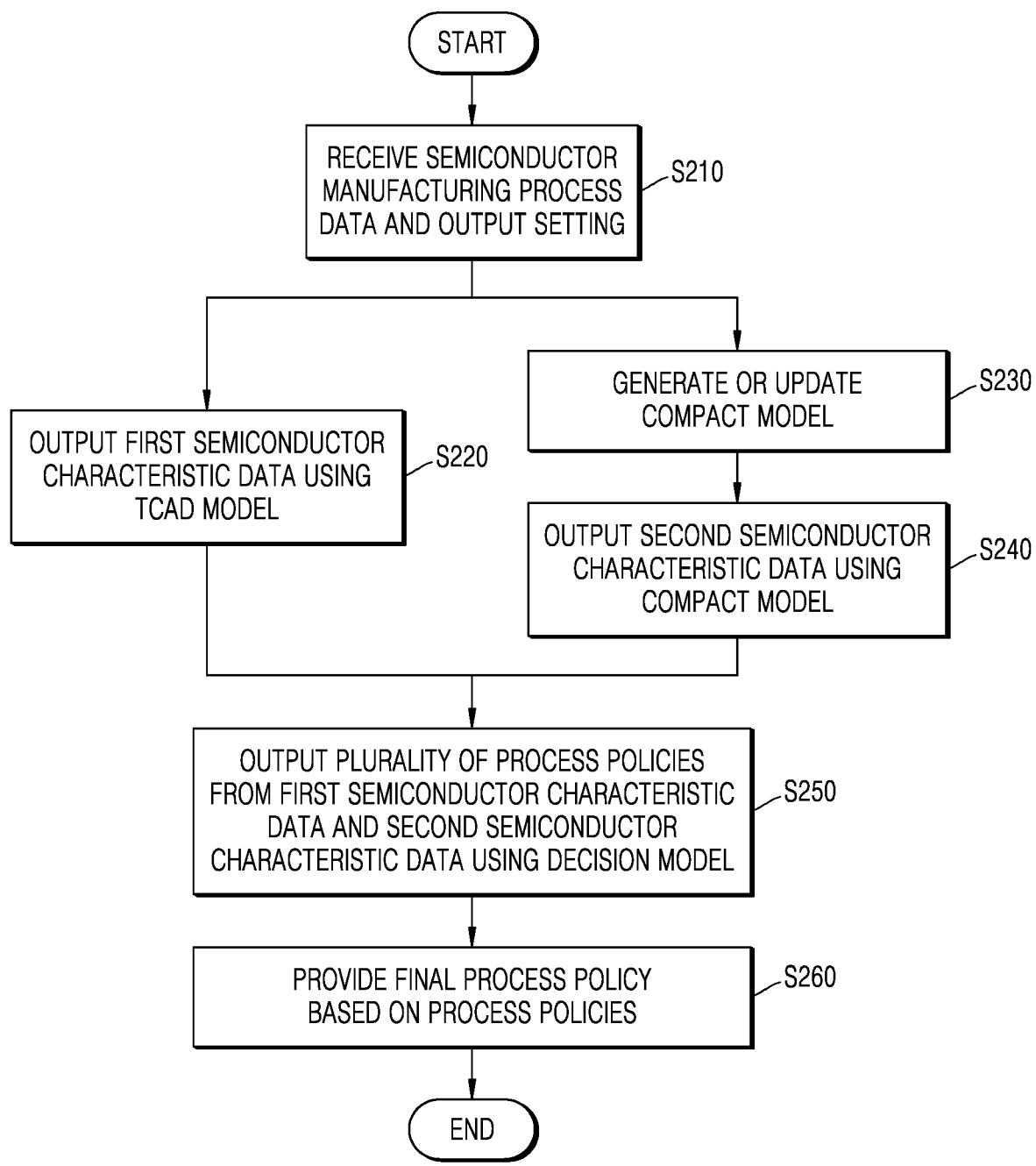
FIG. 2 is a flowchart of a method of guiding a semiconductor manufacturing process, according to an example embodiment.

FIG. 2 is a flowchart of a method of guiding a semiconductor manufacturing process, according to an example embodiment. The same reference numerals of FIG. 1 will be used to refer to the same or similar elements.

The electronic device 1 may receive semiconductor manufacturing process data corresponding to a target semiconductor product and an output setting for setting an electrical and/or structural characteristic of the target semiconductor product in operation S210.

The electronic device 1 may output first semiconductor characteristic data corresponding to the semiconductor manufacturing process data using a TCAD model, which is trained through machine learning based on training data including TCAD simulation data, in operation S220. For example, the TCAD model trained through machine learning may be stored in the storage 12, and the processor 13 may input the semiconductor manufacturing process data to the TCAD model and output the first semiconductor characteristic data, that is received from the TCAD model, the first semiconductor characteristic data corresponding to an electrical and/or structural characteristic of the target semiconductor product.

The electronic device 1 may generate or update a compact model based on a value obtained by actually measuring the electrical and/or structural characteristic of the semiconductor product in operation S230 and may output second semiconductor characteristic data corresponding to the semiconductor manufacturing process data using the compact model in operation S240. For example, the compact model may be newly generated or updated in real time based on measurement information acquired by measuring, using semiconductor measuring equipment, an electrical and/or structural characteristic of a real semiconductor product, which has been manufactured by semiconductor manufacturing equipment. The processor 13 may input the semiconductor manufacturing process data into the compact model and may output the second semiconductor characteristic data that is received from the compact model, the second semiconductor characteristic data corresponding to the electrical and/or structural characteristic of the target semiconductor product.

The electronic device 1 may output a plurality of process policies based on the first semiconductor characteristic data and the second semiconductor characteristic data by using a decision model, which generates a process policy based on information about an electrical and/or structural characteristic of a semiconductor product, in operation S250. The first semiconductor characteristic data may reflect a result (e.g., a simulation result) of the TCAD model, and the second semiconductor characteristic data may reflect a result of actually measuring the semiconductor product. Accordingly, the electronic device 1 may output the process policies by considering both the first semiconductor characteristic data and the second semiconductor characteristic data.

The electronic device 1 may provide a final process policy based on the process policies in operation S260. For example, the electronic device 1 may provide at least one of the process policies as a final process policy or may determine a priority order of at least some of the process policies and provide a final process policy by displaying the process policies according to the priority order.

Figure 3:
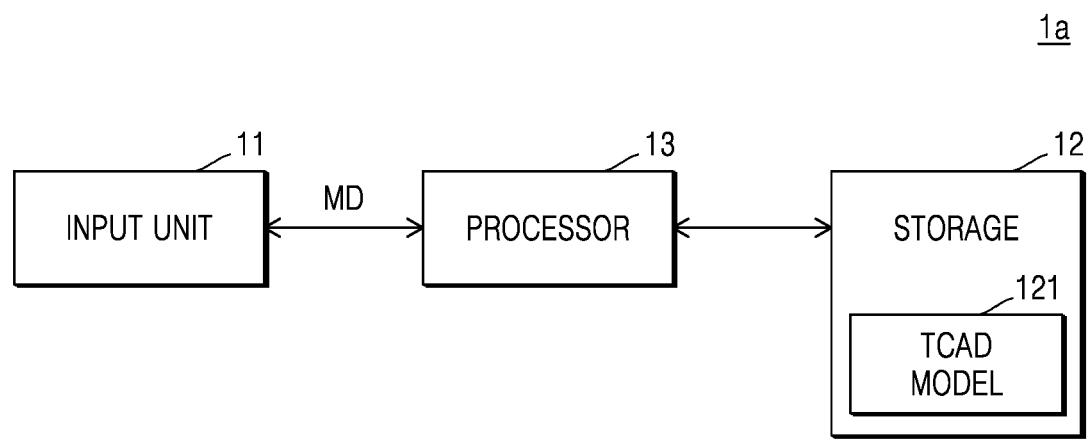
FIG. 3 is a block diagram of an electronic device according to an example embodiment.
Figure 4:
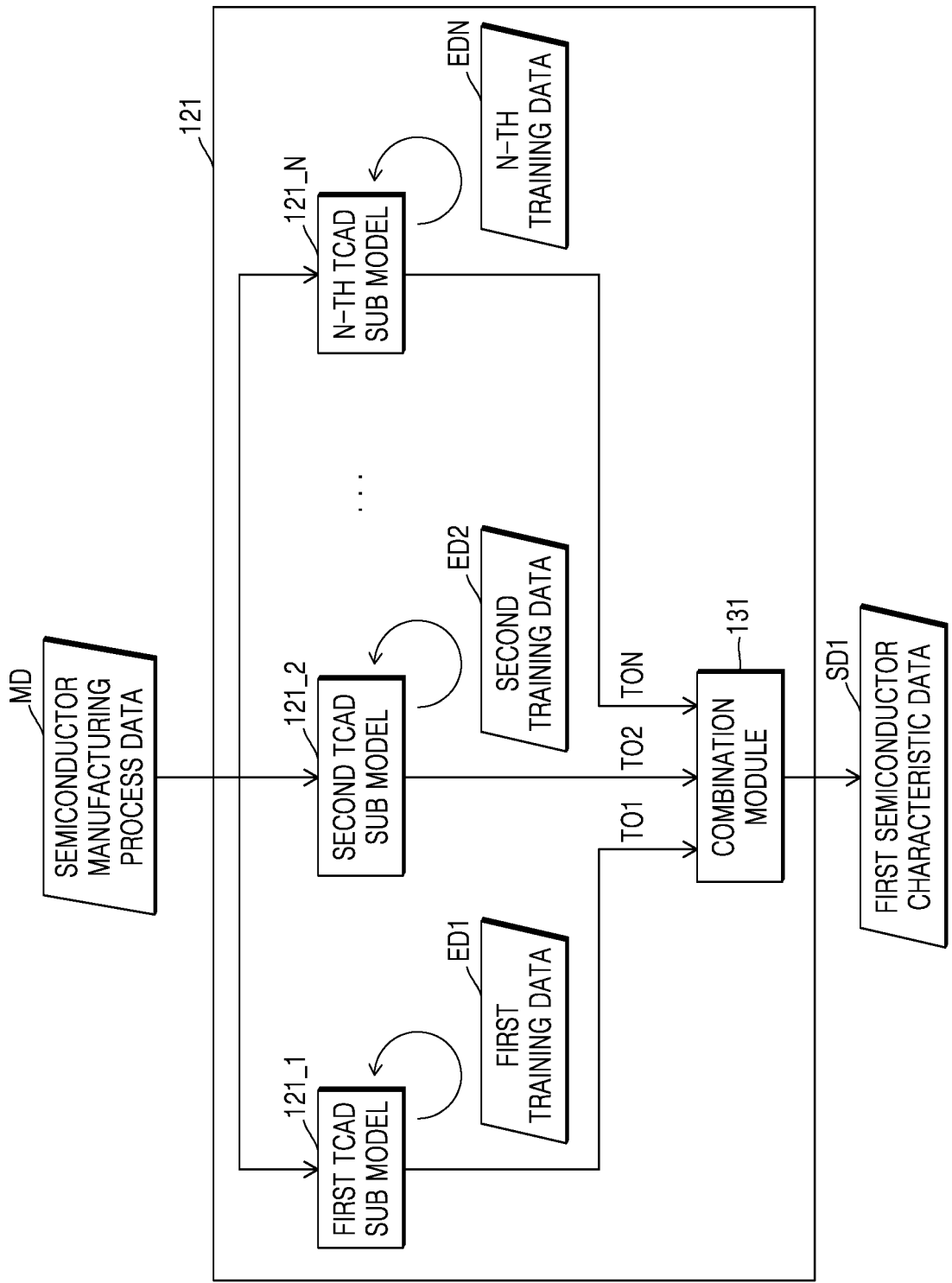
FIG. 4 is a block diagram for describing a technology computer-aided design (TCAD) model, according to an example embodiment.

FIG. 3 is a block diagram of an electronic device according to an example embodiment; FIG. 4 is a block diagram for describing a TCAD model, according to an example embodiment; FIG. 5 is a table for describing semiconductor manufacturing process data, according to an example embodiment; and FIG. 6 is a table for describing an output setting according to an example embodiment. The same reference numerals of FIG. 1 will be used to refer to the same or similar elements.

Referring to FIG. 3, an electronic device 1a may include the input unit 11, the storage 12, and the processor 13. The storage 12 may include a TCAD model 121.

According to an example embodiment, the input unit 11 may transmit semiconductor manufacturing process data MD to the processor 13, and the processor 13 may generate first semiconductor characteristic data from the semiconductor manufacturing process data MD by using the TCAD model 121. In this case, the TCAD model 121 may include a data model, which is stored in the storage 12 through a series of learning processes. Alternatively, the processor 13 may receive training data and train the TCAD model 121, which is stored in the storage 12, through machine learning.

Referring to FIG. 4, the TCAD model 121 may include a plurality of TCAD sub models, e.g., first through N-th TCAD sub models 121_1 through 121_N, and a combination module 131. Here, N is a natural number equal to or greater than 2. The processor 13 may perform arithmetic processing by inputting the semiconductor manufacturing process data MD to the TCAD model 121. For example, the first through the N-th TCAD sub models 121_1 through 121_N may be implemented by an artificial neural network model, which may include at least one selected from a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, and a classification network.

Each of the first through the N-th TCAD sub models 121_1 through 121_N may perform machine learning to simulate a different electrical and/or structural characteristic of a semiconductor product. An electrical and/or structural characteristic of a semiconductor product may include at least one selected from a threshold voltage, gain, linearity, a breakdown voltage, oxide degradation, a junction and/or tunneling leakage current, a C-V curve, an I-V curve, an Id-Vg curve, a Vd-Id curve, a profile image (e.g., an electric potential profile, a doping profile, or an electrostatic field profile) of the semiconductor product, and a field image of the semiconductor product. Items of the electrical and/or structural characteristic of the semiconductor product, which are respectively simulated by the first through the N-th TCAD sub models 121_1 through 121_N, may be the same as items of an output setting.

For example, the first TCAD sub model 121_1 may be trained based on first training data ED1, which may include data about the C-V curve of a semiconductor product. The first TCAD sub model 121_1 may perform a simulation based on the semiconductor manufacturing process data MD and generate first predicted data TO1 about the C-V curve. In another example, the second TCAD sub model 121_2 may be trained based on second training data ED2, which may include image data of a cross-section of a semiconductor product to show doping concentration. The second TCAD sub model 121_2 may perform a simulation based on the semiconductor manufacturing process data MD and generate second predicted data TO2 including the image data of the cross-section of the semiconductor product to show the doping concentration. In still another example, the N-th TCAD sub model 121_N may be trained based on N-th training data EDN, which may include data about an electrostatic field characteristic of a semiconductor product. The N-th TCAD sub model 121_N may perform a simulation based on the semiconductor manufacturing process data MD and generate N-th predicted data TON about the electrostatic field characteristic of the semiconductor product.

The processor 13 may perform a simulation by using at least one selected from the first through the N-th TCAD sub models 121_1 through 121_N. For example, the processor 13 may select a TCAD sub model to be used for a simulation from the first through the N-th TCAD sub models 121_1 through 121_N, based on the semiconductor manufacturing process data MD and/or the output setting. For example, when the output setting includes a C-V curve item, the processor 13 may select a TCAD sub model (e.g., the first TCAD sub model 121_1) that generates predicted data about a C-V curve.

According to an example embodiment, the processor 13 may set an environment variable. For example, the processor 13 may set environment variables involved in simulation equipment, a designer, manufacturing equipment, and the like. The environment variables may include a calibration parameter and information about data scaling. The processor 13 may set the environment variables in response to a user input and may also set the environment variables using data that has been stored in the storage 12. The first through the N-th TCAD sub models 121_1 through 121_N may perform a simulation, taking into account the environment variables.

The TCAD model 121 may generate the first through the N-th predicted data TO1 through TON. The first through the N-th predicted data TO1 through TON may be respectively output from the first through the N-th TCAD sub models 121_1 through 121_N. In other words, the first through the N-th predicted data TO1 through TON may correspond to an electrical and/or structural characteristic of a semiconductor product, which are respectively predicted by the first through the N-th TCAD sub models 121_1 through 121_N from the semiconductor manufacturing process data MD.

The TCAD model 121 may output first semiconductor characteristic data SD1 by combining the first through the N-th predicted data TO1 through TON by using the combination module 131. For example, the combination module 131 may include a hardware and/or software module, which is implemented to represent data indicating general characteristics of the semiconductor product by combining the first through the N-th predicted data TO1 through TON including different electrical characteristics and different structural characteristics from each other. The processor 13 may generate the first semiconductor characteristic data SD1 using the TCAD model 121 and may store the first semiconductor characteristic data SD1 in the storage 12 or use the first semiconductor characteristic data SD1 in subsequent arithmetic processing.

Referring to FIG. 5, the semiconductor manufacturing process data MD may include data values according to element types to be used for a semiconductor manufacturing process. The semiconductor manufacturing process data MD may include information A (e.g., a name of a product) about a product, information B (e.g., a name of a process) about a process, information C (e.g., a name of a semiconductor device) about a semiconductor product, information D about a version, information E about a semiconductor layout, and information F about ion implantation. Embodiments are not limited thereto, and the semiconductor manufacturing process data MD may omit or replace any of the information above or may further include various other items.

Referring to FIG. 6, the output setting may include the type of data related to an output of the semiconductor product and a field indicating selection or non-selection of a corresponding type of data.

When a user selects at least one of the types of data related to an output in the output setting, the processor 13 may output a value, a text, and/or an image about the type of selected data through a simulation. The output setting may include at least one selected from a threshold voltage, gain, linearity, a breakdown voltage, oxide degradation, a junction and/or tunneling leakage current, a C-V curve, an I-V curve, an Id-Vg curve, a Vd-Id curve, a profile image (e.g., an electric potential profile, a doping profile, or an electrostatic field profile) of a semiconductor product, and a field image of the semiconductor product. Embodiments are not limited thereto, and the output setting may include, for example, information about a layout of a semiconductor circuit and/or an image of the layout, and may also include various data indicating the structure and characteristics of a semiconductor product.

For example, referring to FIG. 6, a user selects a threshold voltage Vt, a breakdown voltage, and a profile image of a semiconductor product for output settings, the processor 13 may perform a simulation using a TCAD model and/or a compact model and may output the threshold voltage Vt, the breakdown voltage, and the profile image as a predicted electrical and/or structural characteristic of a target semiconductor product.

Figure 7:
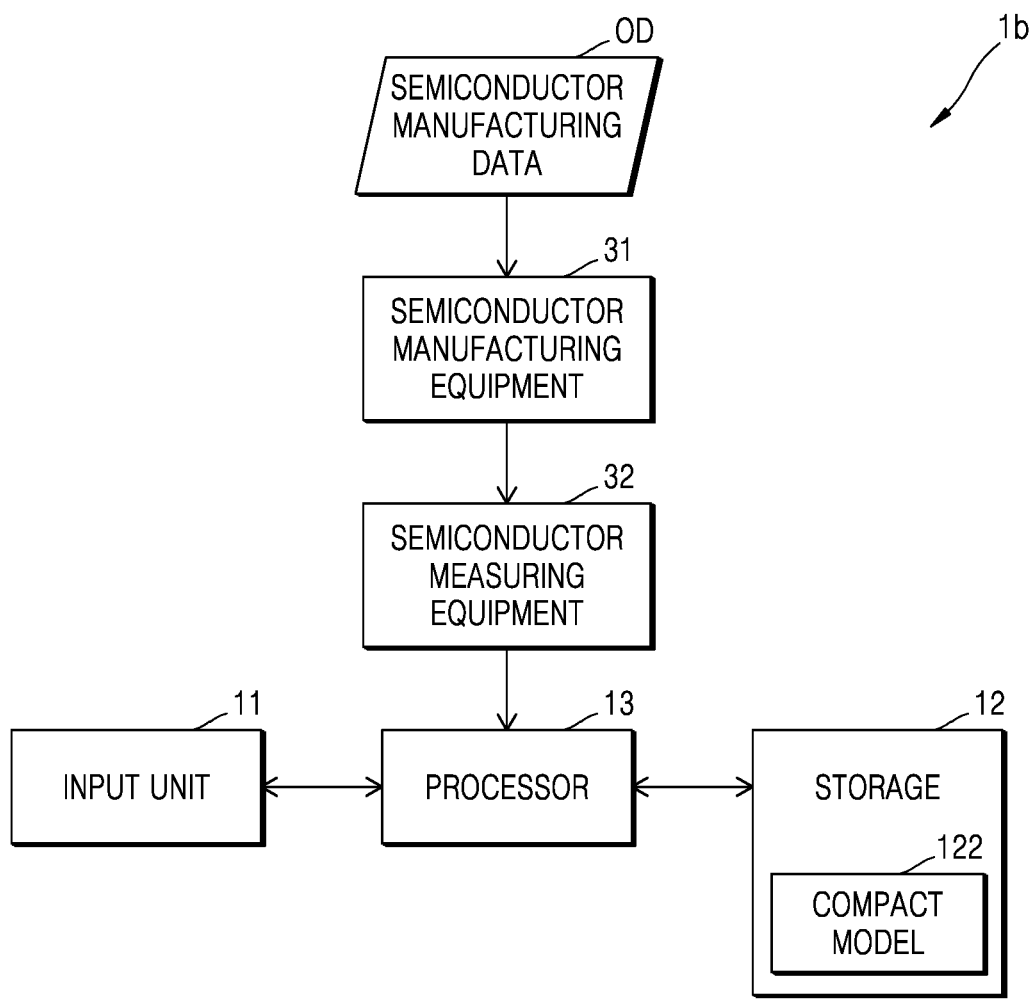
FIG. 7 is a block diagram of an electronic device according to an example embodiment.
Figure 8:
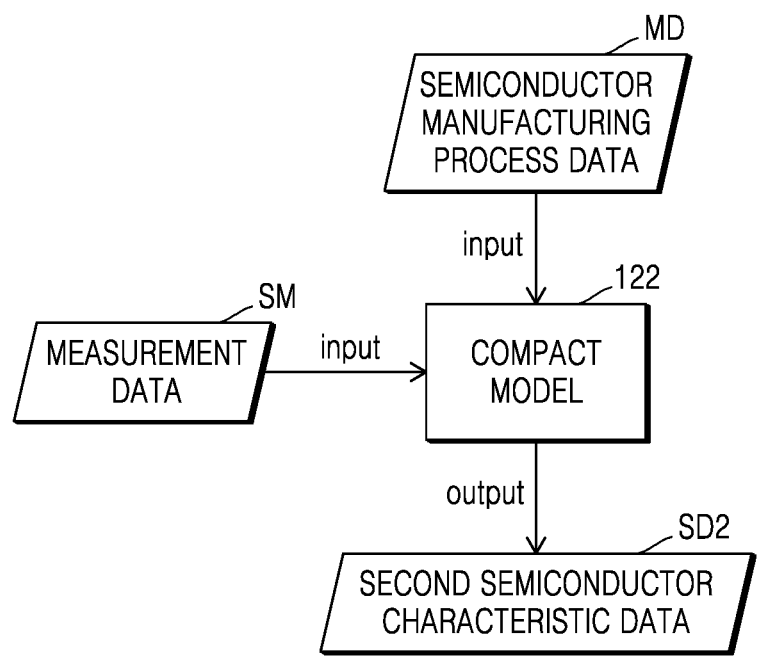
FIG. 8 is a block diagram for describing a compact model according to an example embodiment.
Figure 9:
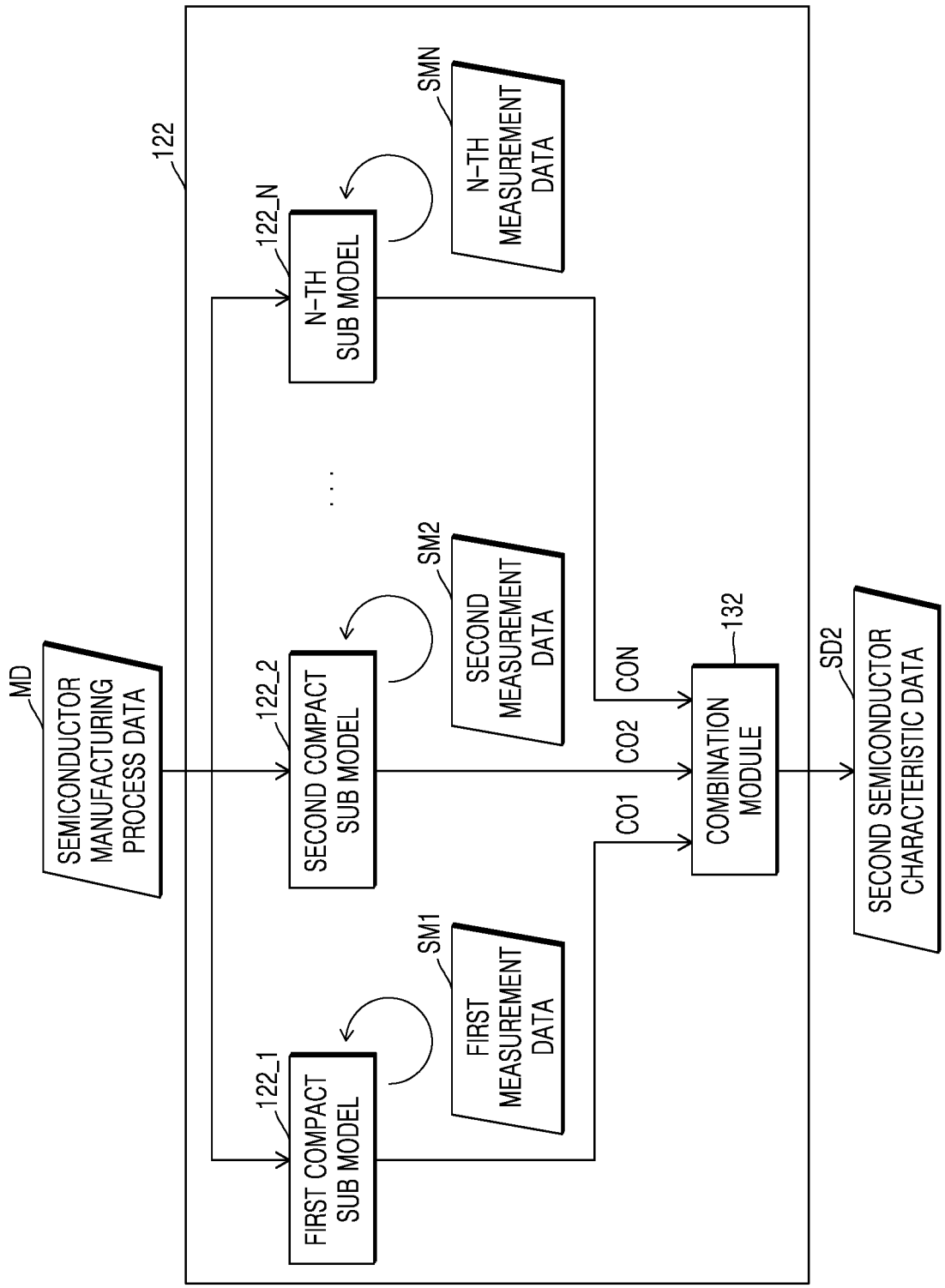
FIG. 9 is a block diagram for describing a compact sub model according to an example embodiment.

FIG. 7 is a block diagram of an electronic device according to an example embodiment, FIG. 8 is a block diagram for describing a compact model according to an example embodiment, and FIG. 9 is a block diagram for describing a compact sub model according to an example embodiment.

Referring to FIG. 7, an electronic device 1b may include the input unit 11, the storage 12, and the processor 13, and the storage 12 may include a compact model 122. The electronic device 1b, semiconductor manufacturing equipment 31, and semiconductor measuring equipment 32 may form a semiconductor system. Embodiments are not limited thereto, and the electronic device 1b may be implemented as a semiconductor system separated from the semiconductor manufacturing equipment 31 and the semiconductor measuring equipment 32.

According to an example embodiment, the input unit 11 may transmit the semiconductor manufacturing process data MD to the processor 13, and the processor 13 may generate second semiconductor characteristic data from the semiconductor manufacturing process data MD by using the compact model 122. The processor 13 may generate or update the compact model 122 based on measurement data SM and store the compact model 122 in the storage 12.

The compact model 122 may be generated or updated based on the measurement data SM. The measurement data SM may include an electrical and/or structural characteristic of a semiconductor product actually measured by the semiconductor measuring equipment 32. The semiconductor product measured by the semiconductor measuring equipment 32 may have been manufactured by the semiconductor manufacturing equipment 31 based on semiconductor manufacturing data OD. The semiconductor manufacturing data OD may be related to a manufacture of a target semiconductor device or a manufacture of a semiconductor device similar to the target semiconductor device.

The compact model 122 may be updated in response to the measurement of an electrical and/or structural characteristic of a semiconductor product by the semiconductor measuring equipment 32. For example, in response to the reception of the measurement data SM from the semiconductor measuring equipment 32, the processor 13 may update the compact model 122 to reflect the latest measurement data SM. The processor 13 may receive the measurement data SM from the semiconductor measuring equipment 32 through the input unit 11 or the communication unit 15.

The storage 12 may include equipment information of at least one selected from the semiconductor manufacturing equipment 31 and the semiconductor measuring equipment 32. For example, a semiconductor product may have a different electrical and/or structural characteristic according to the type of the semiconductor manufacturing equipment 31. In addition, the electrical and/or structural characteristic of a semiconductor product may be differently measured according to the type of the semiconductor measuring equipment 32. To reduce errors involved in the types of the semiconductor manufacturing equipment 31 and the semiconductor measuring equipment 32, the storage 12 may include various kinds of equipment information such as information about a manufacturer of the semiconductor manufacturing equipment 31 and a manufacturer of the semiconductor measuring equipment 32, model information of the semiconductor manufacturing equipment 31 and the semiconductor measuring equipment 32, and performance information thereof. The processor 13 may update the compact model 122 with reference to the equipment information stored in the storage 12.

Referring to FIG. 8, the compact model 122 may be a sort of data model and may perform a simulation based on the semiconductor manufacturing process data MD. To acquire an accurate simulation result, the processor 13 may update the compact model 122 based on the measurement data SM. In other words, the processor 13 may output second semiconductor characteristic data SD2 based on the semiconductor manufacturing process data MD by using the compact model 122 that has been updated based on the measurement data SM.

Referring to FIG. 9, the compact model 122 may include a plurality of compact sub models, e.g., first through N-th compact sub models 122_1 through 122_N, and a combination module 132. For example, N may be a natural number equal to or greater than 2. In another example, N may be equal to the number of first through N-th TCAD sub models 121_1 through 121_N described above. In other words, the processor 13 may generate the same number of first through N-th compact sub models 122_1 through 122_N as the first through the N-th TCAD sub models 121_1 through 121_N. Each of the first through the N-th compact sub models 122_1 through 122_N may include information about the same electrical and/or structural characteristic as a corresponding one of the first through the N-th TCAD sub models 121_1 through 121_N. For example, the first compact sub model 122_1 may generate first output data CO1 about a C-V curve when the first predicted data TO1 of the first TCAD sub model 121_1 is about a C-V curve in FIG. 4. When the second TCAD sub model 121_2 includes image data of the cross-section of a semiconductor product to show doping concentration in FIG. 4, the second compact sub model 122_2 may generate second output data CO2, which includes image data of a cross-section of a semiconductor product to show doping concentration.

The processor 13 may perform a simulation using at least one selected from the first through the N-th compact sub models 122_1 through 122_N. For example, the processor 13 may select a compact sub model to be used for a simulation from the first through the N-th compact sub models 122_1 through 122_N, based on the semiconductor manufacturing process data MD and/or an output setting. For example, when the output setting includes a C-V curve item, the processor 13 may select a compact sub model that generates output data about a C-V curve.

According to an example embodiment, the processor 13 may set an environment variable. For example, the processor 13 may set environment variables involved in simulation equipment, a designer, manufacturing equipment, and the like. The environment variables may include a calibration parameter and information about data scaling. The processor 13 may set the environment variables in response to a user input and may also set the environment variables using data that has been stored in the storage 12. The first through the N-th compact sub models 122_1 through 122_N may perform a simulation, taking into account the environment variables.

The compact model 122 may generate first through N-th output data CO1 through CON, each of which includes information about a different electrical and/or structural characteristic. The compact model 122 may output the second semiconductor characteristic data SD2 by combining the first through the N-th output data CO1 through CON using the combination module 132. For example, the combination module 132 may include a hardware and/or software module, which is implemented to represent data indicating general characteristics of the semiconductor product by combining the first through the N-th output data CO1 through CON including different electrical characteristics and/or different structural characteristics from each other. The processor 13 may generate the second semiconductor characteristic data SD2 using the compact model 122 and may store the second semiconductor characteristic data SD2 in the storage 12 or use the second semiconductor characteristic data SD2 in subsequent arithmetic processing.

Figure 10:
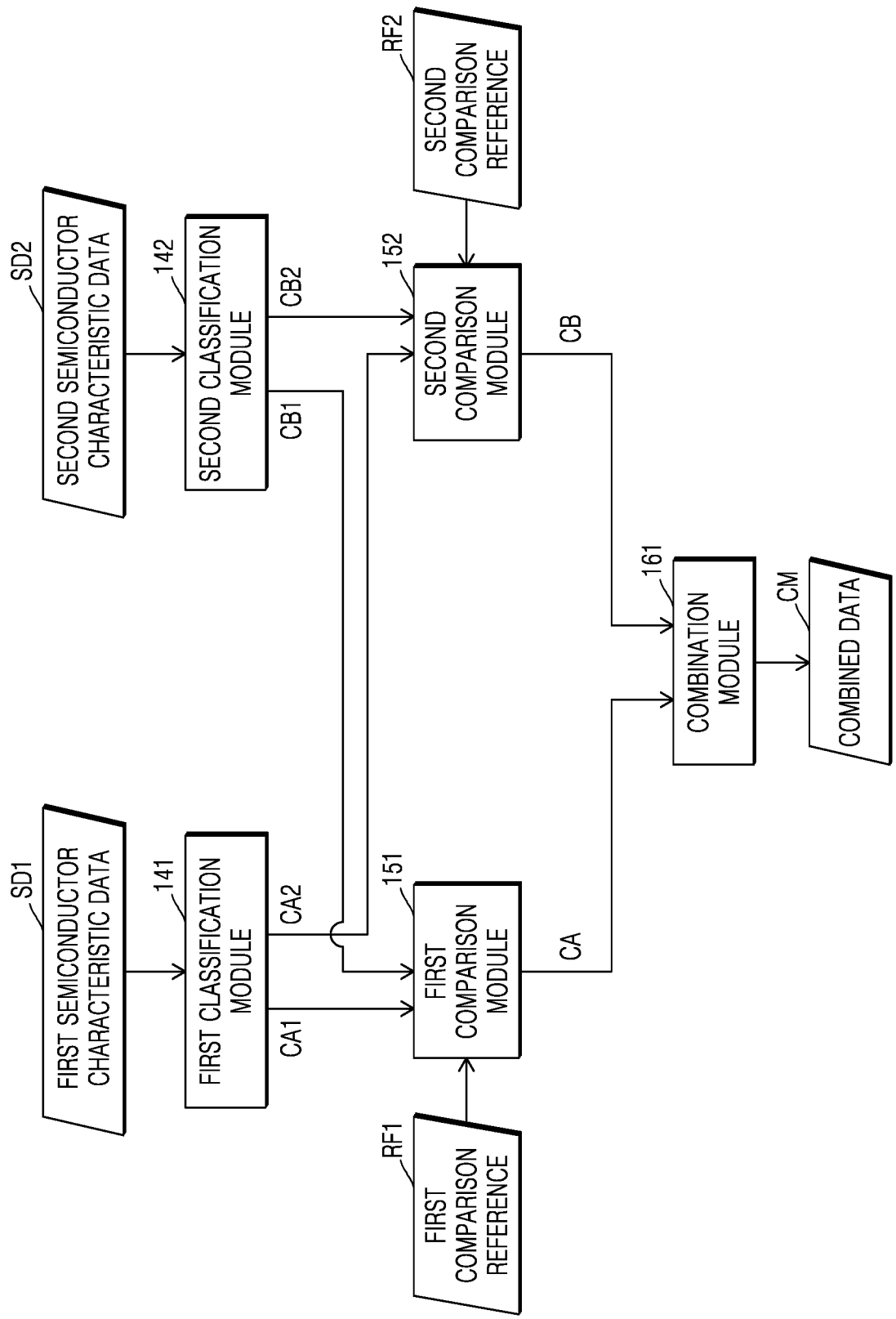
FIG. 10 is a block diagram for describing an operation of comparing first semiconductor characteristic data with second semiconductor characteristic data, according to an example embodiment.
Figure 11:
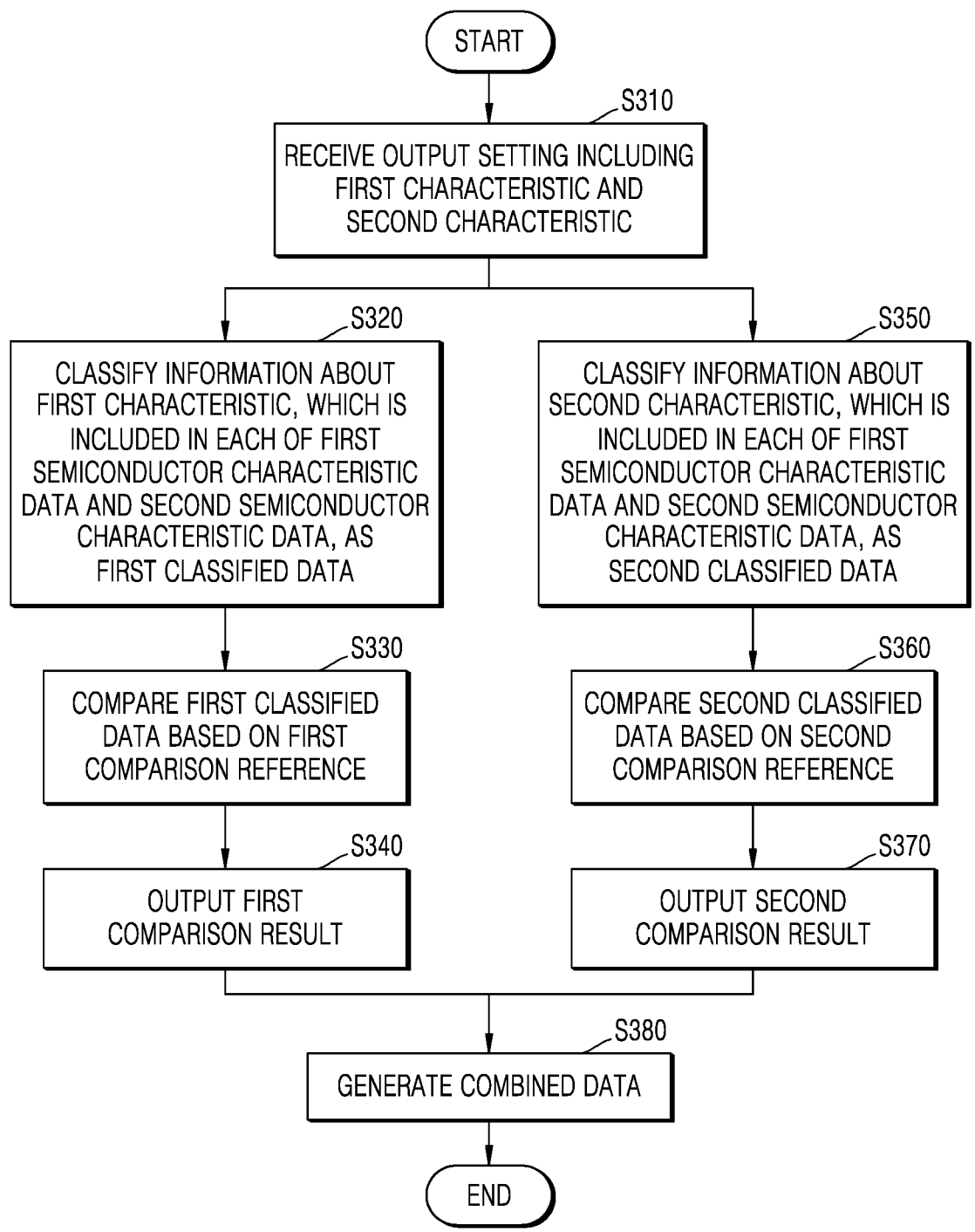
FIG. 11 is a flowchart of a comparison operation according to an example embodiment.

FIG. 10 is a block diagram for describing an operation of comparing first semiconductor characteristic data with second semiconductor characteristic data, according to an example embodiment; and FIG. 11 is a flowchart of a comparison operation according to an example embodiment.

Referring to FIGS. 10 and 11, the processor 13 may generate the first semiconductor characteristic data SD1 by using the TCAD model 121 and the second semiconductor characteristic data SD2 by using the compact model 122 and may generate combined data CM based on the first semiconductor characteristic data SD1 and the second semiconductor characteristic data SD2.

In detail, the processor 13 may receive an output setting, which includes a first characteristic (e.g., the breakdown voltage selected as the output setting in FIG. 6) and a second characteristic (e.g., the profile image of a semiconductor product selected as the output setting in FIG. 6) among an electrical and/or structural characteristic of a semiconductor product, in operation S310.

The processor 13 may classify information about the first characteristic, which is included in each of the first semiconductor characteristic data SD1 and the second semiconductor characteristic data SD2, as first classified data CA1 or CB1 in operation S320. In detail, referring to FIG. 10, the processor 13 may classify information about the first characteristic in the first semiconductor characteristic data SD1 as the first classified data CA1 by using a first classification module 141. In addition, the processor 13 may classify information about the first characteristic in the second semiconductor characteristic data SD2 as the first classified data CB1 by using a second classification module 142. The first classified data CA1 and CB1 may include the same kind of an electrical characteristic or the same kind of a structural characteristic.

Similarly, the processor 13 may classify information about the second characteristic, which is included in each of the first semiconductor characteristic data SD1 and the second semiconductor characteristic data SD2, as second classified data CA2 or CB2 in operation S350. In detail, referring to FIG. 10, the processor 13 may classify information about the second characteristic in the first semiconductor characteristic data SD1 as the second classified data CA2 by using the first classification module 141. In addition, the processor 13 may classify information about the second characteristic in the second semiconductor characteristic data SD2 as the second classified data CB2 by using the second classification module 142. The second classified data CA2 and CB2 may include the same kind of an electrical characteristic or the same kind of a structural characteristic.

The processor 13 may compare the first classified data CA1 of the first semiconductor characteristic data SD1 with the first classified data CB1 of the second semiconductor characteristic data SD2 based on a first comparison reference RF1 in operation S330 and may output first comparison result data CA in operation S340. In detail, the processor 13 may compare the first classified data CA1 with the first classified data CB1 by using a first comparison module 151 and may output, as the first comparison result data CA, data that more agrees with the first comparison reference RF1 between the first classified data CA1 and the first classified data CB1.

The first comparison reference RF1 may correspond to the first characteristic and may be set according to the nature of the first characteristic. For example, when the first characteristic is a breakdown voltage, the first comparison reference RF1 may be set to having a less breakdown voltage. In this case, the processor 13 may output, as the first comparison result data CA, data that corresponds to a less breakdown voltage between the first classified data CA1 and the first classified data CB1. A method of setting the first comparison reference RF1 is not limited to the description above. For example, the first comparison reference RF1 may be set, taking into account at least one selected from a priority order, a risk taking degree, and a target range, which are set for the first characteristic, and any combination thereof. For example, the first comparison reference RF1 may be set to a target range set for the first characteristic, and the processor 13 may output, as the first comparison result data CA, data that more agrees with the target range set for the first characteristic indicated by the first comparison reference RF1 between the first classified data CA1 and the first classified data CB1.

The processor 13 may compare the second classified data CA2 of the first semiconductor characteristic data SD1 with the second classified data CB2 of the second semiconductor characteristic data SD2 based on a second comparison reference RF2 in operation S360 and may output second comparison result data CB in operation S370. In detail, the processor 13 may compare the second classified data CA2 with the second classified data CB2 by using a second comparison module 152 and may output, as the second comparison result data CB, data that more agrees with the second comparison reference RF2 between the second classified data CA2 and the second classified data CB2.

The second comparison reference RF2 may correspond to the second characteristic and may be set according to the nature of the second characteristic. A method of setting the second comparison reference RF2 is not limited to the description above. For example, the second comparison reference RF2 may be set, taking into account at least one selected from a priority order, a risk taking degree, and a target range, which are set for the second characteristic, and any a combination thereof.

The processor 13 may generate combined data by combining the first comparison result data CA with the second comparison result data CB in operation S380. In detail, referring to FIG. 10, the processor 13 may generate the combined data CM by combining the first comparison result data CA with the second comparison result data CB by using a combination module 161. For example, the first comparison result data CA may be about the first characteristic, and the second comparison result data CB may be about the second characteristic. Accordingly, the processor 13 may combine the first comparison result data CA with the second comparison result data CB by using the combination module 161 to generate the combine data CM including a plurality of semiconductor characteristics of a semiconductor product. The combine data CM may include a plurality of pieces of comparison result data, e.g., the first comparison result data CA and the second comparison result data CB.

Although FIGS. 10 and 11 illustrate the classification and comparison of information regarding only the first and the second characteristics, embodiments are not limited thereto, and classification and comparison may be performed on characteristics of at least two semiconductor products. In this case, at least two classification models and at least two comparison models may be used.

Figure 12:
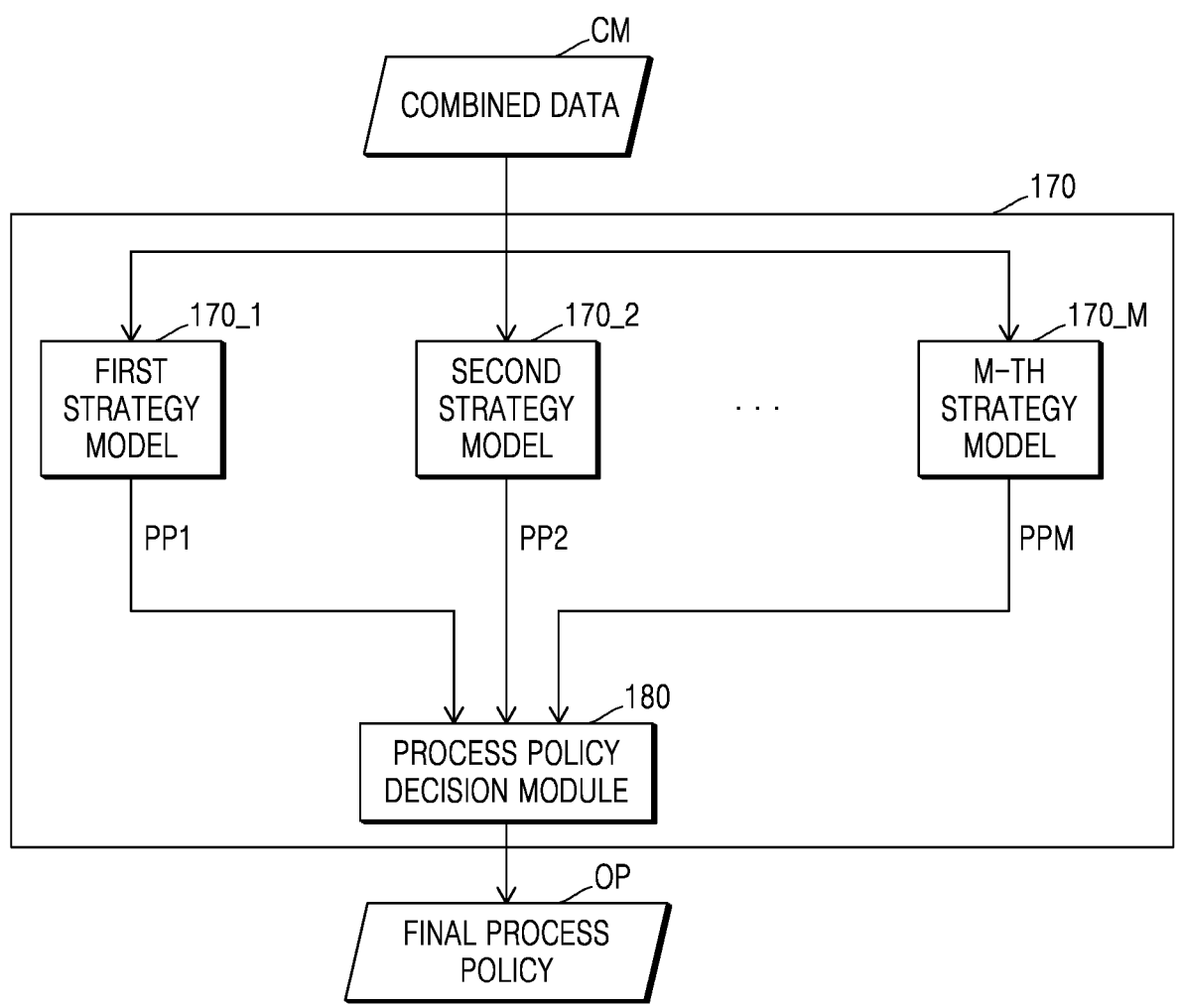
FIG. 12 is a block diagram for describing a method of generating a plurality of process policies and an optimal process policy, according to an example embodiment.

FIG. 12 is a block diagram for describing a method of generating a plurality of process policies and a final process policy, according to an example embodiment.

Referring to FIG. 12, a decision model 170 may include a plurality of strategy models, e.g., first through M-th strategy models 170_1 through 170_M (where M is a natural number equal to or greater than 2), and a process policy decision module 180. The decision model 170 may receive the combined data CM in FIG. 10 and output a final process policy (e.g., an optimal process policy) OP.

In detail, the first through the M-th strategy models 170_1 through 170_M of the decision model 170 may respectively generate first through M-th process policies PP1 through PPM based on the combined data CM. The first through the M-th strategy models 170_1 through 170_M may respectively generate different process policies according to respective different strategic references. Strategic references may include at least one selected from a risk taking degree, a priority order of an electrical and/or structural characteristic, and a target range of an electrical and/or structural characteristic and a combination thereof. Each of the first through the M-th strategy models 170_1 through 170_M may be trained to generate a process policy according to a strategic reference.

Here, the risk taking degree may refer to a degree of giving a priority to the performance (e.g., bandwidth) of a semiconductor product over the reliability (e.g., durability or yield) of the semiconductor product. For example, when the risk taking degree of a semiconductor product increases, the performance of the semiconductor product may increase, but the reliability of the semiconductor product may decrease. In an embodiment, the risk taking degree may be calculated based on various kinds of information related to a semiconductor product. For example, the risk taking degree may be determined using a performance score calculated based on an electrical and/or structural characteristic of a semiconductor product and a reliability score calculated based on a change in a second characteristic with respect to a change in a first characteristic, wherein the first and the second characteristics are included in the electrical and/or structural characteristic of the semiconductor product.

Here, the first characteristic may include at least one selected from characteristics related to ion implantation (e.g., an ion implantation energy, an ion implantation angle, an ion implantation projection range, and an ion implantation mask), characteristics related to a design structure (e.g., a gate oxide, a gate length, a gate width, a shallow trench isolation (STI) depth and/or slope, and a contact position), and internal physical characteristics (e.g., random dopant fluctuation, trap distribution, and mobility). The second characteristic may include at least one selected from a threshold voltage, gain, linearity, a breakdown voltage, oxide degradation, a junction and/or tunneling leakage current, a C-V curve, an I-V curve, an Id-Vg curve, a Vd-Id curve, a profile image (e.g., an electric potential profile, a doping profile, and/or an electrostatic field profile) of a semiconductor product, and a field image of the semiconductor product. The kinds of the first and the second characteristics described above are just examples, and embodiments are not limited thereto. The first and the second characteristics may include various other characteristics.

For example, a first strategic reference of the first strategy model 170_1 may be set to generate a process policy having a high risk taking degree. In this case, the first strategy model 170_1 may output the first process policy PP1 for a semiconductor product having high performance while providing low production yield.

The priority order of an electrical and/or structural characteristic may refer to a priority order value assigned to each of an electrical and/or structural characteristic of a semiconductor product. A strategic reference may be set to generate a process policy allowing a semiconductor characteristic having high priority to have an appropriate value. For example, a second strategic reference of the second strategy model 170_2 may be set to give the highest priority to a leakage current among an electrical and/or structural characteristic of a semiconductor product. In this case, the second strategy model 170_2 may output the second process policy PP2 designed for a low leakage current. A strategic reference set based on a priority order value is not limited to the description above. For example, a strategic reference may be set to generate a process policy allowing a plurality of semiconductor characteristics having at least a certain priority order value to have appropriate values.

The target range of an electrical and/or structural characteristic may refer to a target range of a measurement value (or a simulation value) of each of an electrical and/or structural characteristic of a semiconductor product. For example, an M-th strategic reference of the M-th strategy model 170_M may be set to allow at least one electrical and/or structural characteristic to be in the target range. In this case, the M-th strategy model 170_M may output the M-th process policy PPM allowing the at least one electrical and/or structural characteristic to be in the target range. In other words, the first through the M-th strategy models 170_1 through 170_M may respectively output different process policies, i.e., the first through the M-th process policies PP1 through PPM, with respect to the same input (i.e., the combined data CM).

The processor 13 may receive a decision weight from a user through the input unit 11 and/or the communication unit 15. For example, the decision weight may include a priority order of at least one or some of a plurality of semiconductor characteristics. The semiconductor characteristics may include an electrical and/or structural characteristic of a semiconductor product itself and/or an electrical and/or structural characteristic of at least one element included in the semiconductor product. In an embodiment, the processor 13 may receive a decision weight with respect to the target semiconductor product from a user.

The process policy decision module 180 of the decision model 170 may determine the final (e.g., optimal) process policy OP based on the first through the M-th process policies PP1 through PPM. In an embodiment, the process policy decision module 180 may calculate a priority score of each of the first through the M-th process policies PP1 through PPM by using the decision weight and may determine the final process policy OP based on calculated priority scores. For example, the process policy decision module 180 may determine, as the final process policy OP, the first process policy PP1 that has the highest priority score among the first through the M-th process policies PP1 through PPM. A method of determining the final process policy OP by using the process policy decision module 180 is not limited to the example described above, and there may be at least one final process policy OP. For example, the final process policy OP may include all or some of the first through the M-th process policies PP1 through PPM prioritized based on the decision weight.

The processor 13 may provide the final process policy OP output from the decision model 170 to a user of the electronic device 1 as a process policy, which optimally agrees with the semiconductor manufacturing process data MD and the user selected values. For example, the processor 13 may provide a user with the final process policy by displaying the final process policy OP through the display 14.

Figure 13:
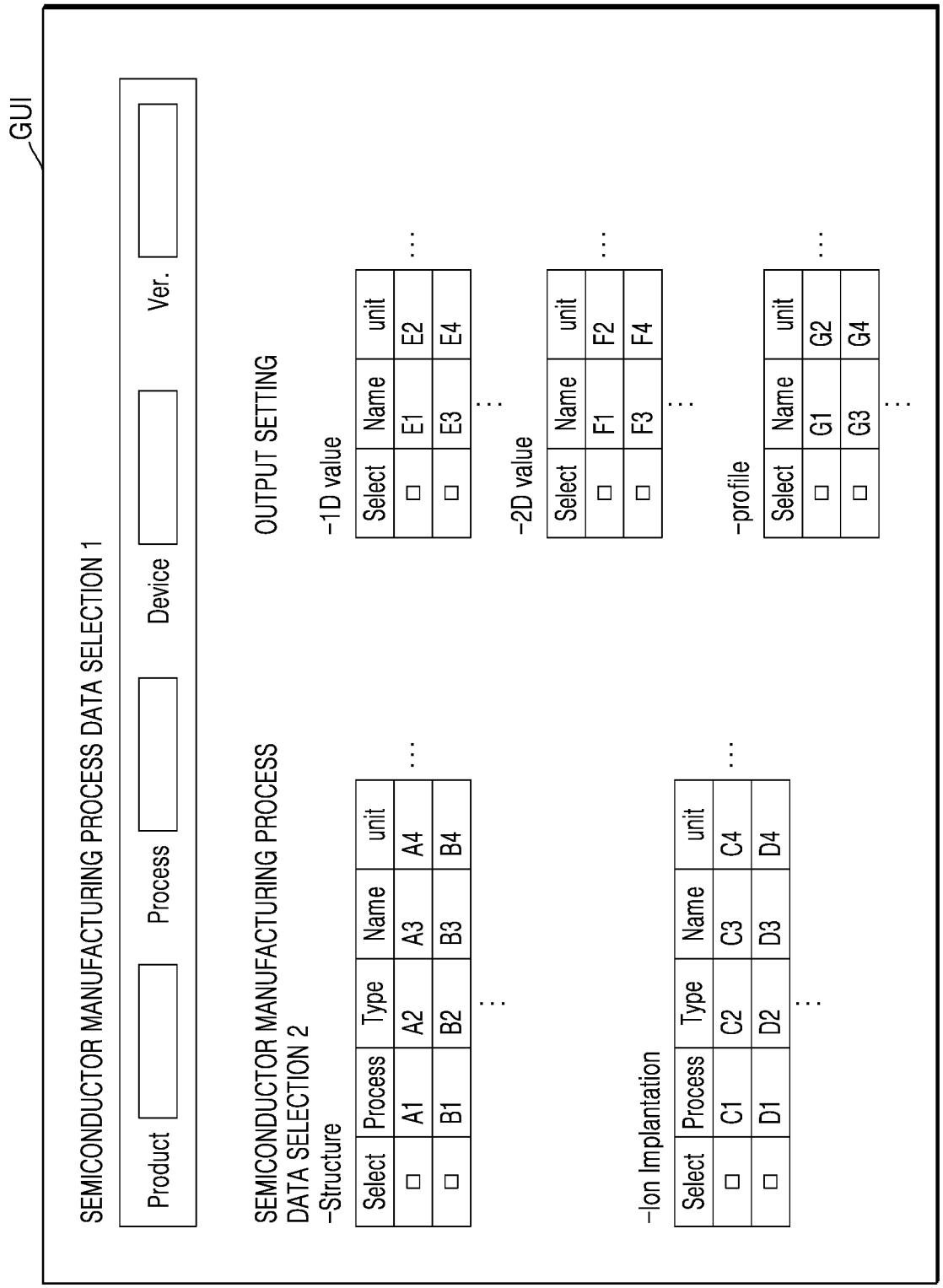
FIG. 13 is a diagram of a graphical user interface according to an example embodiment.

FIG. 13 is a diagram of a graphical user interface according to an example embodiment.

Referring to FIG. 13, the processor 13 may display a graphical user interface (GUI) through the display 14. The GUI may include menus "semiconductor manufacturing process data selection 1" and "semiconductor manufacturing process data selection 2" for selecting information to be included in the semiconductor manufacturing process data MD. Through the menu "semiconductor manufacturing process data selection 1", the processor 13 may receive one or more inputs related to a semiconductor product, a semiconductor manufacturing process, a semiconductor device, and a semiconductor product version, which are included in the semiconductor manufacturing process data MD. Through the menu "semiconductor manufacturing process data selection 2", the processor 13 may receive at least one selected from information about a semiconductor layout (or structure) and information about ion implantation, which corresponds to the product, process, device, and/or version selected in the menu "semiconductor manufacturing process data selection 1".

The GUI may include a menu "output setting" for selecting at least one characteristic, which a user desires to be provided with as a simulation result of a target semiconductor product, among an electrical and/or structural characteristic of the target semiconductor product. For example, through the menu "output setting", the processor 13 may receive at least one item of information included in each of one-dimensional (1D) value information (e.g., a voltage or current value), two-dimensional (2D) value information (e.g., a voltage-current (V-I) curve), and profile information (e.g., 3D electrical characteristics, doping concentration or electrostatic field information).

Figure 14:
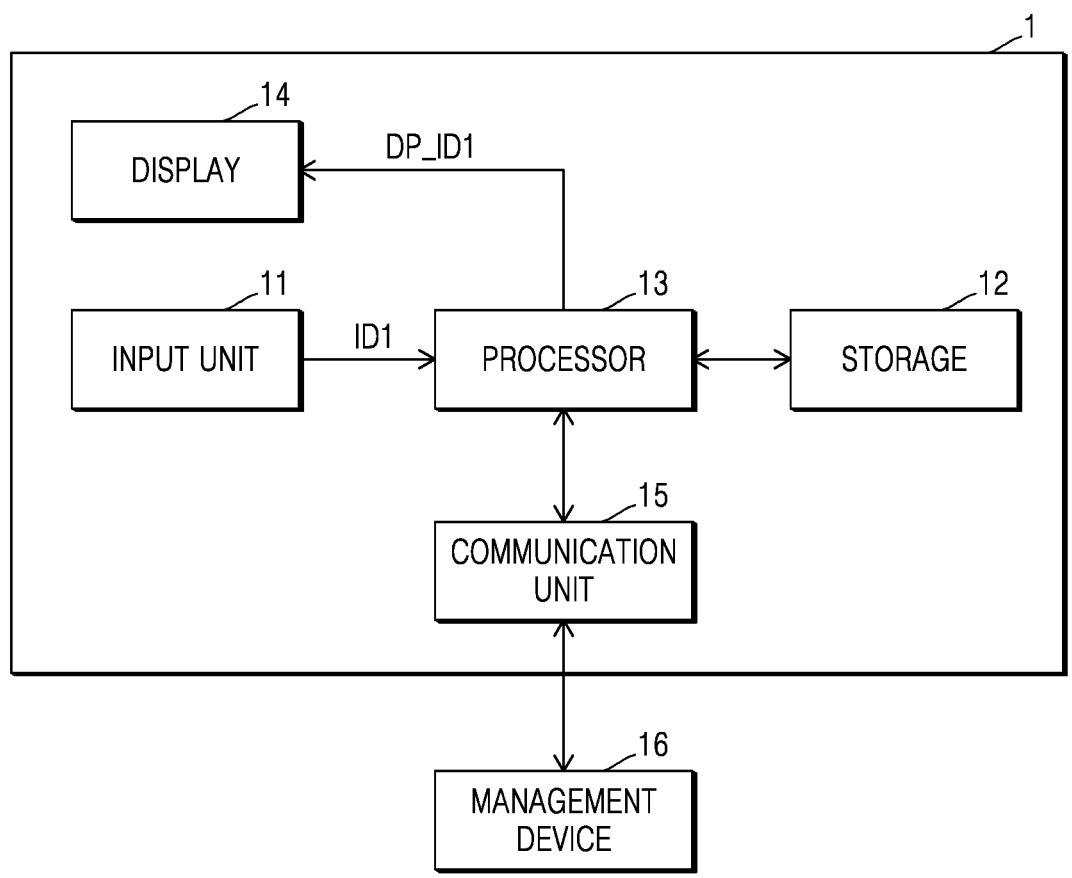
FIG. 14 is a block diagram of an electronic system according to an example embodiment.

FIG. 14 is a block diagram of an electronic system according to an example embodiment.

Referring to FIG. 14, an electronic system 2 may include the electronic device 1 and a management device 16. The electronic device 1 may have substantially the same structure as the electronic device 1 of FIG. 1.

The electronic device 1 may receive user information ID1 from a user. For example, the user may input the user information ID1, which is personalized, to the electronic device 1 through an input device such as a keyboard. The processor 13 may identify an authority level of the user information ID1.

For example, the management device 16 may be a server outside the electronic device 1 and may include a plurality of items of user information and data about use history of the electronic device 1. The processor 13 may transmit the user information ID1 to the management device 16 through the communication unit 15, and the management device 16 may transmit information about an authority level to the processor 13 through the communication unit 15 in response to the user information ID1. The processor 13 may identify the authority level of the user information ID1 based on the information about the user information ID1, which is received through the management device 16.

Alternatively, the storage 12 may store information about an authority level. The processor 13 may identify the authority level of the user information ID1 based on the information about the user information ID1, which is stored in the storage 12. For example, the processor 13 may identify a first level, which corresponds to an authority level assigned to a foundry company, based on the user information ID1 of the foundry company and may identify a second level, which corresponds to an authority level assigned to a fabless company, based on the user information ID1 of the fabless company.

The processor 13 may provide a user with at least part of the semiconductor manufacturing process data MD according to the identified authority level. In an embodiment, when the identified authority level is the first level, the processor 13 may provide all of items (e.g., product, process, device, version, layout or structure, and ion implantation in FIG. 13) of the semiconductor manufacturing process data MD to a user. When the identified authority level is the second level, the processor 13 may not provide all of items of the semiconductor manufacturing process data MD to a user (e.g., an ion implantation item is not provided). The processor 13 may provide at least a part of the final process policy OP to a user according to the identified authority level. In an embodiment, when the identified authority level is the first level, the processor 13 may provide all of items (e.g., design structure, applied voltage, and the type of ion implantation) of the final process policy OP to a user. When the identified authority level is the second level, the processor 13 may not provide some of the items of the final process policy OP to a user.

According to an embodiment, when there are a plurality of final process policies OP, the processor 13 may provide at least one of the final process policies OP to a user. In an embodiment, when the identified authority level is the first level, the processor 13 may provide all of the final process policies OP to a user. When the identified authority level is the second level, the processor 13 may provide only one of the final process policies OP to a user.

The range of information, which is provided by the processor 13 to a user according to an authority level, is not limited to the examples described above and may vary with embodiments. For example, there may be at least three authority levels, and the processor 13 may set such that the at least three authority levels have different ranges of information to be provided to a user.

The processor 13 may block, mask, erase, and/or hide at least a part of the semiconductor manufacturing process data MD and at least a part of the final process policy OP according to an authority level and may display data DP ID1, which includes remaining information (that is, accessible information according to the authority level), on the display 14.

The term "module" may refer to a software component and/or a hardware component such as a field programmable gate array (FPGA) or an application specific integrated circuit (ASIC) and a "module" may perform certain functions. However, a "module" is not limited to software or hardware. A "module" may be configured to be included in an addressable storage medium or to reproduce one or more processors. Accordingly, for example, a "module" may include components such as software components, object-oriented software components, class components, and task components, processes, functions, attributes, procedures, subroutines, segments of program code, drivers, firmware, microcode, circuits, data, databases, data structures, tables, arrays, and variables. A function provided in components and "modules" may be integrated with a smaller number of components and "modules" or divided into additional components and "modules".

While the inventive concept has been particularly shown and described with reference to example embodiments thereof, it will be understood that various changes in form and details may be made therein without departing from the spirit and scope of the following claims.

What is claimed is:

1. A method of guiding a semiconductor manufacturing process, the method comprising:
   receiving semiconductor manufacturing process data corresponding to a target semiconductor product;
   generating first semiconductor characteristic data corresponding to the semiconductor manufacturing process data by using a technology computer-aided design (TCAD) model, the TCAD model being trained through machine learning based on training data including TCAD simulation data;
   generating second semiconductor characteristic data corresponding to the semiconductor manufacturing process data by using a compact model, the compact model being generated based on information of measurement of at least one semiconductor characteristic of a first semiconductor product;
   generating, based on the first semiconductor characteristic data and the second semiconductor characteristic data, a plurality of process policies respectively corresponding to a plurality of strategic references, by using a plurality of strategy models; and
   providing a final process policy corresponding to the target semiconductor product based on the plurality of process policies,
   wherein the generating the plurality of process policies includes:
   comparing the first semiconductor characteristic data and the second semiconductor characteristic data based on each of a plurality of reference characteristics, and outputting a plurality of comparison result data by determining data that conforms to each reference characteristic, of the plurality of reference characteristics, between the first semiconductor characteristic data and the second semiconductor characteristic data; and
   generating the plurality of process policies based on the plurality of comparison result data, according to the plurality of strategic references of the plurality of strategy models.

2. The method of claim 1, further comprising receiving a decision weight from a user,
   wherein the providing the final process policy includes determining, based on the decision weight, the final process policy from the plurality of process policies.

3. The method of claim 2, wherein the decision weight includes a priority order of at least one semiconductor characteristic.

4. The method of claim 3, wherein the at least one semiconductor characteristic includes at least one selected from electrical characteristics of a semiconductor product, structural characteristics of the semiconductor product, electrical characteristics of at least one element of the semiconductor product, and structural characteristics of the at least one element.

5. The method of claim 3, wherein the determining the final process policy includes determining, as the final process policy, a process policy having a high priority with respect to the at least one semiconductor characteristic corresponding to the decision weight, among the plurality of process policies.

6. The method of claim 1, further comprising receiving an output setting for setting at least one semiconductor characteristic corresponding to the target semiconductor product,
   wherein the generating the first semiconductor characteristic data includes generating, from an output of the TCAD model, the first semiconductor characteristic data including the at least one semiconductor characteristic corresponding to the output setting, and
   the generating the second semiconductor characteristic data includes generating, from an output of the compact model, the second semiconductor characteristic data including the at least one semiconductor characteristic corresponding to the output setting.

7. The method of claim 1, wherein the plurality of strategy models include a first strategy model and a second strategy model,
   wherein the first strategy model includes a decision model trained based on a first strategic reference among the plurality of strategic references, and
   wherein the second strategy model includes a decision model trained based on a second strategic reference among the plurality of strategic references.

8. The method of claim 7, wherein the plurality of process policies include a first process policy and a second process policy,
   wherein the first process policy is generated by using the first strategy model based on the first strategic reference, and
   wherein the second process policy is generated by using the second strategy model based on the second strategic reference.

9. The method of claim 7, wherein the plurality of strategic references include at least one selected from a risk taking degree, a priority order value of each of a plurality of semiconductor characteristics, and a target range of each of the plurality of semiconductor characteristics.

10. The method of claim 1, wherein the compact model is updated based on information of measurement of a plurality of semiconductor characteristics of the first semiconductor product using external measuring equipment.

11. The method of claim 1, wherein each of the first semiconductor characteristic data and the second semiconductor characteristic data includes data corresponding to a first characteristic and data corresponding to a second characteristic, and
 wherein the outputting the plurality of comparison result data includes:
 classifying, as first classified data, the data corresponding to the first characteristic in each of the first semiconductor characteristic data and the second semiconductor characteristic data;
 classifying, as second classified data, the data corresponding to the second characteristic in each of the first semiconductor characteristic data and the second semiconductor characteristic data;
 generating first comparison result data by comparing the first classified data of the first semiconductor characteristic data with the first classified data of the second semiconductor characteristic data based on a first comparison reference; and
 generating second comparison result data by comparing the second classified data of the first semiconductor characteristic data with the second classified data of the second semiconductor characteristic data based on a second comparison reference.

12. The method of claim 1, wherein the TCAD model includes a plurality of TCAD sub models,
 wherein each of the plurality of TCAD sub models is trained based on a different piece of the training data, and
 wherein the training data includes at least one selected from a threshold voltage, gain, linearity, a breakdown voltage, oxide degradation, a junction and/or tunneling leakage current, a capacitance-voltage curve, a current-voltage curve, a drain current-gate voltage curve, a drain voltage-drain current curve, a profile image of a semiconductor product, and a field image of the semiconductor product.

13. The method of claim 12, wherein the first semiconductor characteristic data is obtained by inputting the semiconductor manufacturing process data to the TCAD model and combining a plurality of pieces of data respectively output from the plurality of TCAD sub models.

14. The method of claim 12, wherein the compact model includes a plurality of compact sub models, and
 wherein the plurality of compact sub models are respectively updated based on information of measurement of different semiconductor characteristics of the first semiconductor product, the plurality of compact sub models being respectively trained in correspondence to the plurality of TCAD sub models.

15. The method of claim 1, further comprising:
 receiving user information; and
 identifying an authority level of the user information,
 wherein the providing the final process policy includes providing at least a part of the final process policy according to the identified authority level.

16. An electronic device for guiding a semiconductor manufacturing process, the electronic device comprising:
 a display;
 at least one non-transitory computer-readable medium; and
 at least one processor configured to execute instructions stored in the at least one non-transitory computer-readable medium,
 wherein the at least one processor is further configured to:
 receive semiconductor manufacturing process data corresponding to a target semiconductor device;
 generate first semiconductor characteristic data corresponding to the semiconductor manufacturing process data by using a technology computer-aided design (TCAD) model, the TCAD model being trained through machine learning based on training data including information about a plurality semiconductor characteristics;
 generate second semiconductor characteristic data corresponding to the semiconductor manufacturing process data by using a compact model, the compact model being generated based on information of measurement of at least one semiconductor characteristic of a first semiconductor device;
 generate, based on the first semiconductor characteristic data and the second semiconductor characteristic data, a plurality of process policies corresponding to a plurality of strategic references by using a plurality of strategy models; and
 control the display to display at least one of the plurality of process policies as a process policy corresponding to the target semiconductor device,
 wherein the at least one processor is further configured to generate the plurality of process policies by performing:
 comparing the first semiconductor characteristic data and the second semiconductor characteristic data based on each of a plurality of reference characteristics, and outputting a plurality of comparison result data by determining data that conforms to each reference characteristic, of the plurality of reference characteristics, between the first semiconductor characteristic data and the second semiconductor characteristic data; and
 generating the plurality of process policies based on the plurality of comparison result data, according to the plurality of strategic references of the plurality of strategy models.

17. The electronic device of claim 16, wherein the plurality of strategy models include a first strategy model and a second strategy model,
 wherein the at least one processor is further configured to generate a first process policy by using the first strategy model based on a first strategic reference among the plurality of strategic references, and
 wherein the at least one processor is further configured to generate a second process policy by using the second strategy model based on a second strategic reference among the plurality of strategic references.

18. The electronic device of claim 16, wherein the plurality of strategic references include at least one selected from a risk taking degree, a priority order value of each of a plurality of semiconductor characteristics, and a target range of each of the plurality of semiconductor characteristics.

19. An electronic system for guiding a semiconductor manufacturing process, the electronic system comprising:
 a communication unit;
 a display;
 a processor configured to:
 receive semiconductor manufacturing process data corresponding to a target semiconductor device;
 output first semiconductor characteristic data corresponding to the semiconductor manufacturing process data by using a technology computer-aided design (TCAD) model, the TCAD model being trained through machine learning based on training data including TCAD simulation data;

output second semiconductor characteristic data corresponding to the semiconductor manufacturing process data by using a compact model, the compact model being generated based on information of measurement of at least one semiconductor characteristic of a first semiconductor device;

generate a plurality of process policies based on the first semiconductor characteristic data and the second semiconductor characteristic data; and a management device configured to receive user information from the processor and transmit, to the processor, information about an authority level corresponding to the user information, wherein the processor is further configured to control the display to display at least a part of the plurality of process policies based on the information about the authority level, wherein the processor is further configured to generate the plurality of process policies by performing:

comparing the first semiconductor characteristic data and the second semiconductor characteristic data based on each of a plurality of reference characteristics, and outputting a plurality of comparison result data by determining data that conforms to each reference characteristic, of the plurality of reference characteristics, between the first semiconductor characteristic data and the second semiconductor characteristic data; and generating the plurality of process policies based on the plurality of comparison result data, according to the plurality of reference characteristics.

* * * * *